United States Patent [19]

Sgro et al.

[11] Patent Number: 5,903,771
[45] Date of Patent: May 11, 1999

[54] SCALABLE MULTI-PROCESSOR ARCHITECTURE FOR SIMD AND MIMD OPERATIONS

[75] Inventors: Joseph A. Sgro, Concord, Mass.; Paul C. Stanton, Merrimack, N.H.

[73] Assignee: Alacron, Inc., Nashua, N.H.

[21] Appl. No.: 08/619,356

[22] Filed: Mar. 21, 1996

Related U.S. Application Data

[63] Continuation of application No. 08/586,066, Jan. 16, 1996, abandoned.

[51] Int. Cl.$^6$ ..................................................... G06F 15/00
[52] U.S. Cl. .................................. 395/800.2; 395/800.14; 395/800.15
[58] Field of Search ........................... 395/800.28, 800.2, 395/800.21, 800.22, 800.14, 800.11, 800.15, 842, 847; 711/117

[56] References Cited

U.S. PATENT DOCUMENTS

| | | | |
|---|---|---|---|
| 4,591,981 | 5/1986 | Kassbov | 395/800 |
| 4,855,903 | 8/1989 | Carleton et al. | 395/200.78 |
| 4,873,626 | 10/1989 | Gifford | 395/300 |
| 5,072,371 | 12/1991 | Benner et al. | 395/800.11 |
| 5,113,523 | 5/1992 | Colley et al. | 395/800.12 |
| 5,136,717 | 8/1992 | Morley et al. | 395/800.16 |
| 5,212,777 | 5/1993 | Gove et al. | 395/570 |
| 5,239,654 | 8/1993 | Ing-Simmons et al. | 395/800.2 |
| 5,247,627 | 9/1993 | Murakami | 395/375 |
| 5,280,474 | 1/1994 | Nickolls et al. | 370/389 |
| 5,307,506 | 4/1994 | Colwell et al. | 395/307 |
| 5,347,710 | 9/1994 | Gall et al. | 29/830 |
| 5,355,508 | 10/1994 | Kan | 395/800.2 |
| 5,361,385 | 11/1994 | Bakalash | 345/424 |
| 5,371,896 | 12/1994 | Gove et al. | 395/800.2 |
| 5,379,193 | 1/1995 | Gall et al. | 361/784 |
| 5,410,727 | 4/1995 | Jaffe et al. | 395/200.64 |
| 5,418,915 | 5/1995 | Matuda et al. | 395/325 |
| 5,418,952 | 5/1995 | Morley et al. | 395/800.14 |
| 5,420,809 | 5/1995 | Read et al. | 364/715.011 |
| 5,504,918 | 4/1996 | Collette et al. | 395/800 |
| 5,581,778 | 12/1996 | Chin et al. | 395/800 |
| 5,588,152 | 12/1996 | Dapp et al. | 395/800 |
| 5,613,136 | 3/1997 | Casavant et al. | 395/800 |
| 5,664,214 | 9/1997 | Taylor et al. | 395/800.2 |

OTHER PUBLICATIONS

The Connection Machine CM–5 Technical Summary Chtes 1–3 & 14–16, Oct. 1991.

*Primary Examiner*—Larry D. Donaghue
*Attorney, Agent, or Firm*—Greenberg Traurig; Richard E. Kurtz, II; Evan R. Smith

[57] ABSTRACT

A multiprocessor device capable of operating in both MIMD and SIMD modes which includes an array of parallel processor elements connected via link ports on each element. A multiplexing means is provided for dynamically configuring the connection topology between link ports so that a direct connection can be made between any two processor elements. Local dual-ported memory is associated with each processor element in the array and is connected through a first port to its associated processor element and through a second port to a multidimensional DMA controller. The DMA controller transfers data autonomously between the processor elements and global resources, including a global memory. For SIMD mode operations, the DMA controller broadcasts duplicate instructions to the dual-ported memory associated with each processor element, and the instructions are then executed by each processor in synchrony.

10 Claims, 7 Drawing Sheets

SCALABLE MULTI-PROCESSOR ARCHITECTURE FOR SIMD AND MIMD OPERATIONS

This Application is a continuation of U.S. application Ser. No. 08/586,066 filed Jan. 16, 1996, now abandoned.

BACKGROUND OF THE INVENTION

1. Field of the Invention

The invention relates in general to multi-processor computers, and in particular to a computer having a high-speed multi-processor architecture which is highly scalable and which can operate in both SIMD and MIMD modes.

2. Related Art

Multiprocessor architectures, which are capable of performing both SIMD mode and MIMD mode operations are known in the art. In SIMD (Single Instruction set Multiple Data set) mode operations, a single instruction source, e.g., a memory device, typically drives multiple parallel processors, which each execute the same operation thread in synchrony upon different data sets. The instructions are typically delivered from the instruction source to the multiple processors via an instruction bus common to all processors. In order for parallel processors to have simultaneous access to the shared instruction source without contention, a high-speed common instruction bus must be must be used. As additional processors are added to a particular SIMD design, the speed requirements of the common instruction bus become greater such that the scalability of the design is limited by the significant economic expense of the required high-speed instruction bus. And, such designs cannot be scaled up to include more processors than can be supported by the fastest bus available within current bus technology.

In MIMD (Multiple Instruction sets Multiple Data sets) mode operations, on the other hand, all parallel processors potentially execute different operation threads on different data sets. In such operations, access to a shared memory is not required, and the use of a shared memory rather tan isolated local memories associated with each processor is actually a hindrance during MIMD operations because that shared memory can become saturated. And, this problem typically increases as more parallel processors are used in a shared memory design, thereby reducing the scalability of the design.

Because of the differences in requirements for SIMD versus MIMD mode operations, different topologies for interconnecting multiple processors with memories have been provided in the prior art depending on which mode of operation is required. And, various schemes have been used for providing multiprocessor architectures which can operate in both SIMD and MIMD modes. U.S. Pat. No. 5,212,777 to Gove et al. describes multiprocessor architectures for reconfigurable SIMD/MIMD mode operations wherein a cross bar switch is provided between a series of processors and a series of memories. The cross bar switch acts as a multiplexor and permits the processor-to-memory interconnection scheme to be changed depending upon which mode of operations is being performed. However, as such designs are scaled up to include a large number of parallel processors, the switching requirements of the cross-bar switch increase dramatically and the cost of providing such a cross-bar switch becomes prohibitive.

U.S. Pat. No. 5,355,508 to Kan discloses a parallel processor system for mixed SIMD/MIMD mode operation wherein a first series of processors and associated memories are configured for and dedicated to SIMD operations while a second series of processors and associated memories are configured for and dedicated to MIMD operations. The SIMD and MIMD processors are connected via a common bus to a shared global memory. A system controller allocates operations which lend themselves to SIMD processing to the SIMD processors and operations which lend themselves to MIMD processing to the MIMD processors. However, the system disclosed by Kan suffers from inefficiency during a period when, e.g., a long series of MIMD operations are performed because, during that time, the dedicated SIMD) processors are not being used.

Many prior art multi-processor devices which support MIMD mode operations comprise a "cluster" architecture in which a series of processors share a common bus and each processor has access to the I/O ports and RAM resources of the other processors. However, multi-processor designs which use cluster architectures often suffer from undesirable processor contention for global memory and I/O. Further, cluster architectures often require expensive high-speed memory and are limited in that they generally cannot support SIMD) mode operations.

OBJECTS AND SUMMARY OF THE INVENTION

It is therefore an object of the invention to provide an improved multi-processor computer.

It is a further object of the invention to provide a multi-processor computer with improved scaling capabilities.

It is a further object of the invention to provide a multi-processor computer which makes efficient use of processor resources.

It is a further object of the invention to provide a multi-processor computer which is less susceptible to memory saturation.

In a preferred embodiment, the invention provides a multiprocessor device which can operate in both MIMD and SIMD modes and which includes an array of parallel processor elements connected via link ports on each element. A multiplexing means is provided for dynamically configuring the connection topology between link ports so that a direct connection can be made between any two processor elements. Local dual-ported memory is associated with each processor element in the array and is connected through a first port to its associated processor element and through a second port to a multidimensional DMA controller. The DMA controller transfers data autonomously between the processor elements and global resources, including a global memory. For SIMD mode operations, the DMA controller broadcasts duplicate instructions to the dual-ported memory associated with each processor element, and the instructions are then executed by each processor in synchrony.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
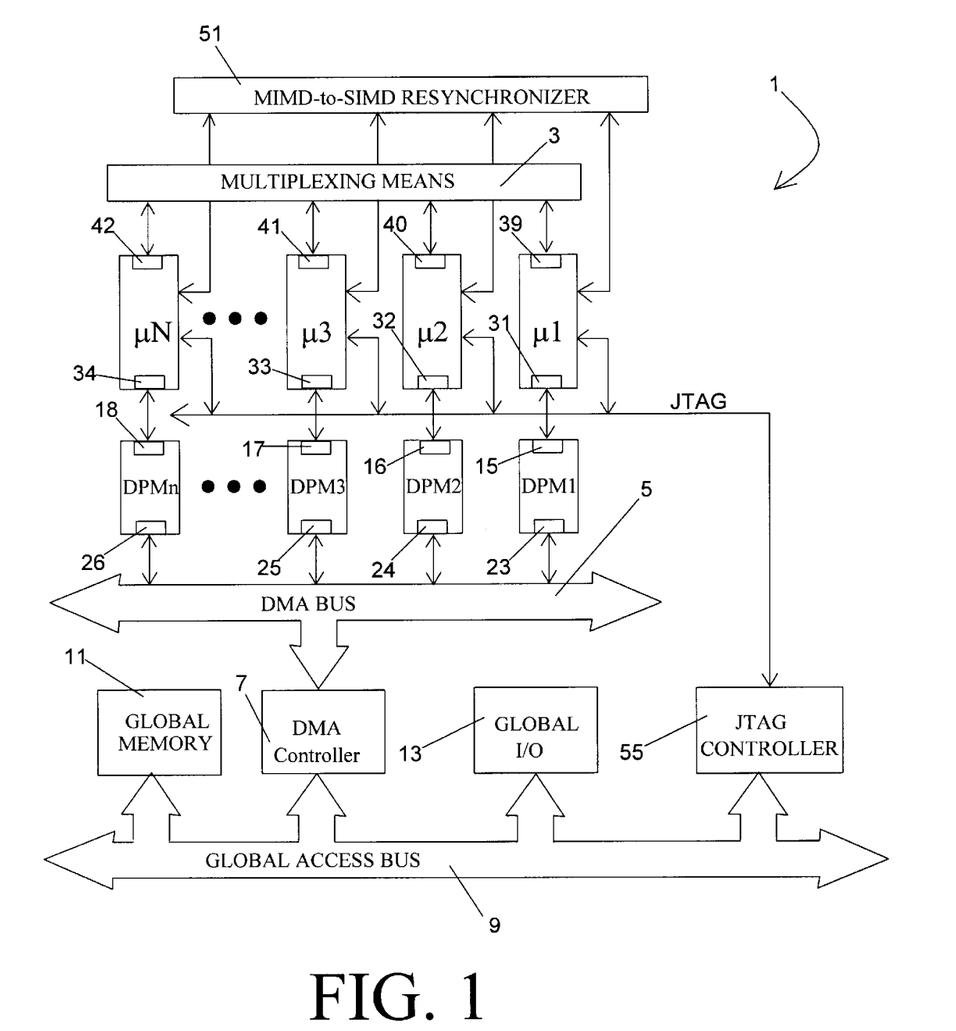
FIG. 1 shows a schematic block diagram illustrating a multi-processor computer architecture according to the invention.

With reference to FIG. 1, the multi-processor computer architecture 1 of the invention according to a preferred embodiment comprises a plurality of processor elements $\mu 1$ through $\mu N$ and a plurality of respectively associated dedicated dual-ported memories DPM1 through DPMn. The processor elements $\mu 1$ through $\mu N$ each preferably comprise a floating point or fixed point DSP processor. Such processors include, e.g., the Super Harvard Architecture Computer (SHARC) chips available from Analog Devices of Norwood Mass, part numbers ADSP21060, ADSP21061, and ADSP21062, which may have clock speeds of, e.g., 40 Mhz or 33 Mhz, and may operate at, e.g. power voltages of 3.3 or 5.0 volts. The processor elements $\mu 1$ through $\mu N$ each preferably comprise internal 1, 2, and 4 MBIT dual-ported SRAM.

Each of the dedicated dual-ported memories DPM1 through DPMn comprises a first DMA (Direct Memory Access) interface 15 through 18 and a second DMA interface 23 through 26. Each dual-ported memory DPM1 through DPMn is connected via its first DMA interface 15 through 18 to a first processor interface 31 through 34 of its associated processor element. This connection is serviced by an internal DMA controller within the processor element itself.

Each dual-ported memory DPM1 through DPMn is connected via its second DMA interface 23 through 26 to a DMA bus 5, which preferably comprises a multidimensional DMA bus. The dual-ported memories, known as Video RAM (VRAM), are used in the present invention as sequential storage devices, and also are used as bridging components in the DMA interface. Each dual-ported memory preferably comprises a bank of DRAM coupled to a Sequential Access Memory (SAM).

The DMA interface between the dual-ported memories DPM1 through DPMn and global resources is controlled via a DMA controller 7, which preferably comprises a series of "random" programmable logic chips or a custom ASIC (Application-Specific Integrated Circuit). It should be noted that the DMA controller 7 is preferably separate and independent from the internal DMA controller within each processor element $\mu 1$ through $\mu N$. Software in the DMA controller 7 provides a multidimensional DMA engine which allows broadcast, on-the-fly transposition, and general direct access to a global memory 11 and a global I/O 13 via a global access bus 9. The DMA engine allows block moves between the dual-ported memories DPM1 through DPMn and global memory 11 via a global access bus 9 and the DMA bus 5 at high throughput rates of, e.g., 160MB/Second. During SIMD mode operations, the DMA controller broadcasts duplicate instructions to each of the dual-ported memories DPM1 through DPMn, and the instructions are then executed by each processor in synchrony. The DMA engine further provides the capability for interleaving of data between the different dual-ported memory banks to support distribution of a common data structure (e.g., an array of 32-bit real or 64-bit complex entities) among the processor elements. The DMA engine is discussed in further detail below with reference to FIG. 5.

Each of the processor elements $\mu 1$ through $\mu N$ comprises a link port interface 39 through 42 connected to a multiplexing means 3. The multiplexing means 3 preferably comprises a cross-bar switch, but may comprise other suitable means such as, e.g., a CMOS switch array. The multiplexing means 3 performs dynamic link port switching, i.e., multiplexing, for purposes of inter-processor communications. The link port interfaces 39 through 42 each comprise six link ports for inter-processor communications. The multiplexing means 3 establishes links between link-port pairs, e.g., one of the six link ports on a first processor element and one of six link ports on a second processor element. These links are used for performing half-duplex bidirectional inter-processor data transfers. Such data transfers can thereby be made at high speeds, e.g., 40 MB/Second. By virtue of the internal DMA controller within each processor element $\mu 1$ through $\mu N$, such data transfers can be performed simultaneously while each processor element is computing.

According to the preferred embodiment of the invention, the connections between the link ports are dynamically reconfigurable. The link ports, when connected in selected configurations, allow data transfers to occur between multiple processor elements in parallel. Because each processor element comprises, e.g., six link ports, its is possible to have multiple link port connections active to a given processor element at a given time, or to have multiple connections between a pair of processor elements active (using multiple link port pairs) at a given time. In some algorithmic steps, data must be exchanged between processor element pairs, which requires two link port interconnections—one for each direction of data movement.

FIGS. 2a through 2e illustrate "number theoretic" link port interconnection topologies which may be used in a 16-processor implementation of the invention. These topologies, which are advantageous for performing SIMD operations, are characterized in that connections are layered in disjoint groups which make efficient use of the switching circuitry used to make the interconnections. In FIGS. 2a through 2e, the lines between the processor elements $\mu 1$ through $\mu 16$ represent link port interconnections. In each of the topologies, any processor element can make a connection with any other processor element.

Figure 2A:
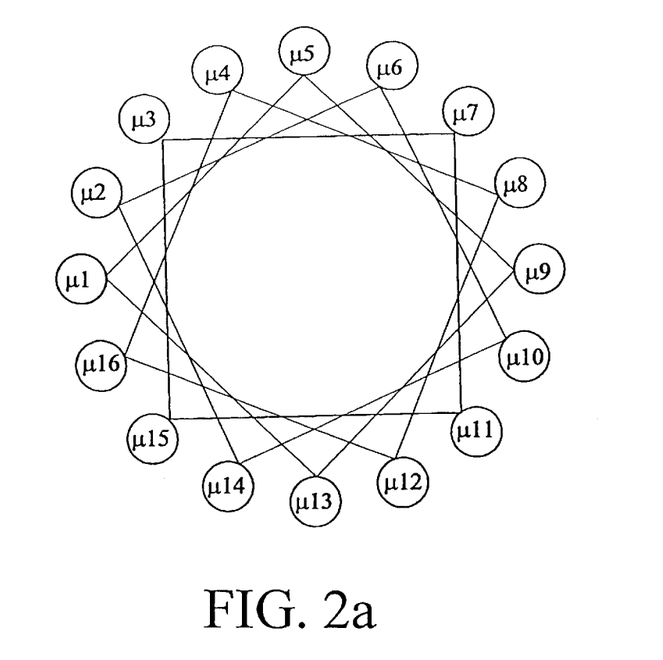
FIG. 2a shows a schematic diagram illustrating a processor interconnection topology having a connection interval of "4".
Figure 2B:
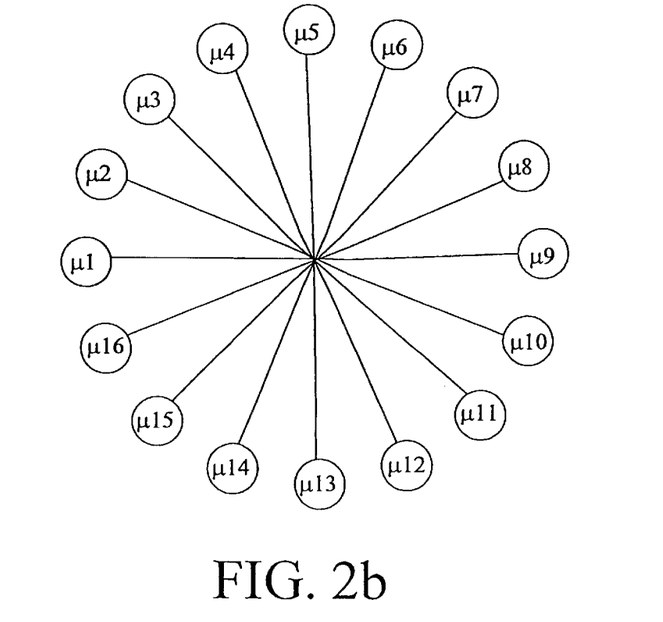
FIG. 2b shows a schematic diagram illustrating a processor interconnection topology having a connection interval of "8".
Figure 2C:
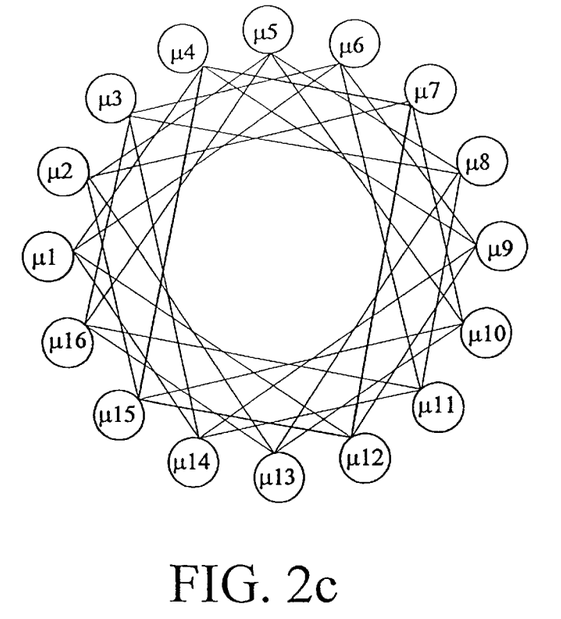
FIG. 2c shows a schematic diagram illustrating a processor interconnection topology having a connection interval of "3–5".
Figure 2D:
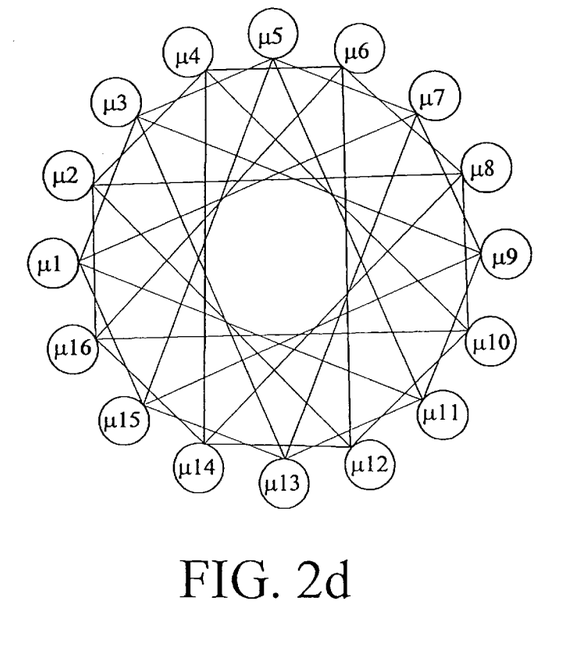
FIG. 2d shows a schematic diagram illustrating a processor interconnection topology having a connection interval of "2–6".
Figure 2E:
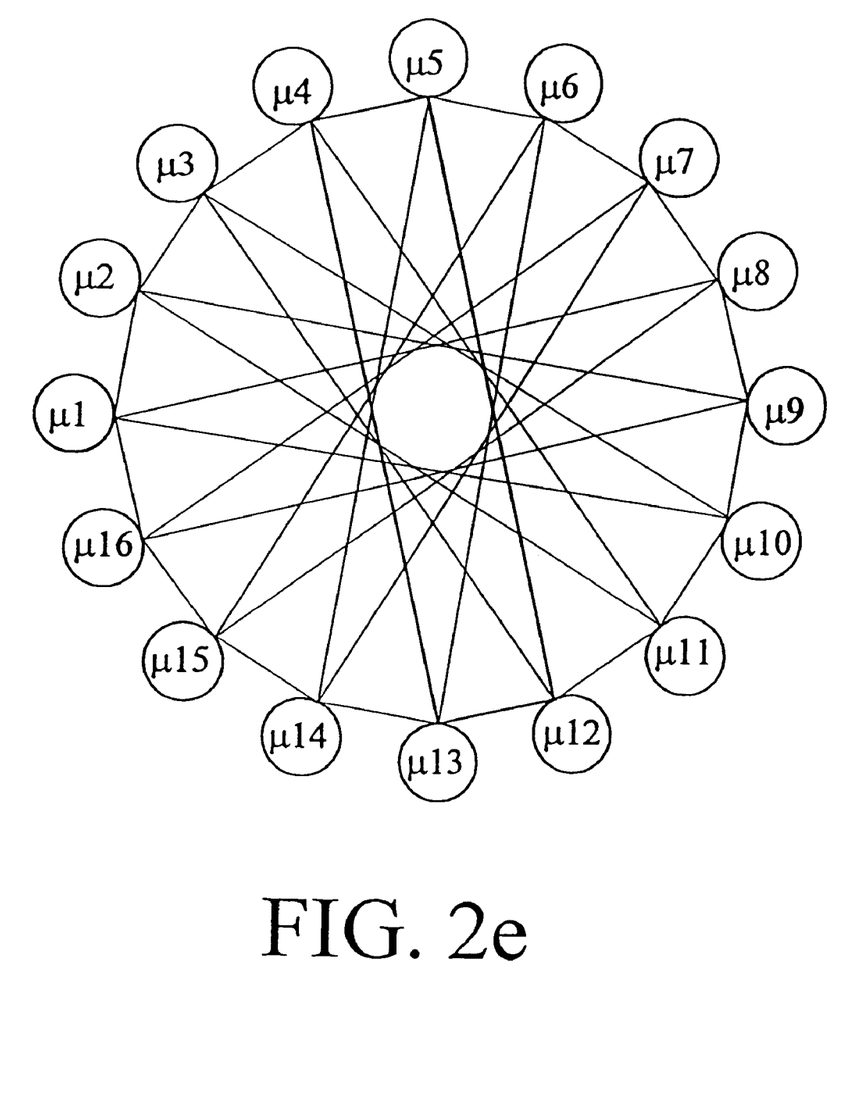
FIG. 2e shows a schematic diagram illustrating a processor interconnection topology having a connection interval of "1–7".

FIG. 2a shows a topology with a connection interval of "4"; that is, a connection is made between every fourth processor element. FIG. 2b shows a topology with a connection interval of "8", wherein a connection is made between every eighth processor element. FIG. 2c shows a topology with a connection interval of "3–5", wherein connection intervals of "3" and "5" are superimposed. FIG. 2d shows a topology with a connection interval of "2–6" wherein connection intervals of "2" and "6" are superimposed, while FIG. 2e shows a topology of "1–7" in which connection intervals of "1" and "7" are superimposed.

A connection between any two processor elements can be made at any time by dynamically reconfiguring the multiplexing means, or a portion thereof, to create one of the topologies shown in FIGS. 2a through 2e. For example, processor element $\mu 1$ can connect to processor elements $\mu 5$ and $\mu 13$ if the interconnection scheme is switched to that shown in FIG. 2a. Processor element $\mu 1$ can connect to processor element $\mu 9$ if the interconnection topology is switched to that shown in FIG. 2b. It can connect to $\mu 4$, $\mu 6$, $\mu 12$, and $\mu 14$ via the topology of FIG. 2c. It can connect to $\mu 3$, $\mu 7$, $\mu 11$, and $\mu 15$ via the topology of FIG. 2d. And, it can connect to $\mu 2$, $\mu 8$, $\mu 10$ and $\mu 16$ via the topology shown in FIG. 2e.

The switching required to create these interconnection topologies can be accomplished using a multiplexing means which comprises 96 six-way CMOS switches. 32 chips, each having 3 switches thereon, are preferably used. Within each of the topologies shown in FIGS. 2c, 2d, and 2e, the processing elements have only two link port connections active at one time. The topologies in each of those diagrams use one pair of link ports per processor element. As noted above, each processor element may comprise six link ports. In such case, the topologies of FIGS. 2c, 2d, and 2e taken together exhaust the link ports available. The topologies shown in FIGS. 2a and 2b use some of the same link port pairs as those shown in FIGS. 2c and 2d. This fact creates some complex conditions which only allow certain switches to be active at a given time. For this reason, the embodiment described below with reference to FIG. 4, in which N-way cross-bar switches are used as the multiplexing means, may be more advantageous in that it is more flexible.

Figure 3:
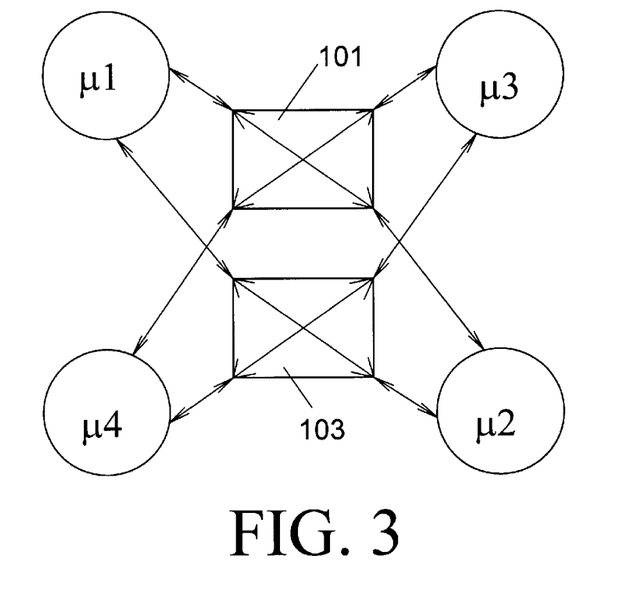
FIG. 3 shows a schematic diagram illustrating an embodiment of the multiplexing means of the invention in which a CMOS switching element is used to perform link port switching.

FIG. 3 illustrates a portion of an embodiment of the multiplexing means of the invention in which a CMOS switching element is used to perform the above-described dynamic link port switching. A pair of 2×2 CMOS switches 101, 103 provides link port connections, designated by arrowed lines, between a series of processor elements. For purposes of simplifying the illustration, only four processor elements are shown and two link ports are shown on each. However, it should be noted that the invention may comprise any number of processor elements, e.g., 16 processor elements, each with six link ports. The basic switch elements 101, 103 can also be seen on FIGS. 2a, 2c, 2d, and 2e as multiple overlapping rectangles.

Figure 4:
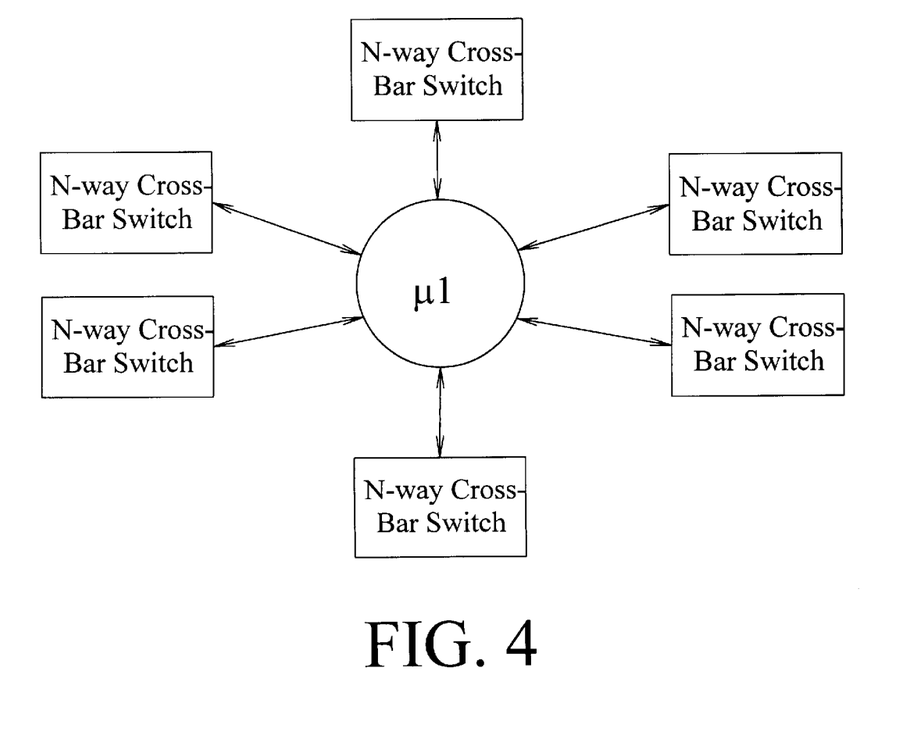
FIG. 4 shows a schematic diagram illustrating an embodiment of the multiplexing means of the invention in which cross-bar switches are used to perform link port switching.

FIG., 4 illustrates an alternate embodiment wherein cross bar switches are used as the multiplexing means between link ports. In such an embodiment, each link port of each processor element is connected to an N-way cross-bar switch, where N is the total number of processor elements. For example, if 16 processor elements are used, and each comprises 6 link ports, then 6 16-way cross-bar switches are used, with each switch connected to one link port on each processor element so that any pair of processor elements can be connected together via one link port. For purposes of simplifying the illustration, FIG. 4 shows only a single processor element connected to the six N-way cross-bar switches.

During processing of SIMD operations, all the processor elements $\mu 1$ through $\mu N$ are synchronized using Mesh Synchronization Protocol (MSP), executing the same instructions in lock step, but on different data. During MIMD operations, the processor elements $\mu 1$ through $\mu N$ operate asynchronously. In asynchronous operation, the processor elements may each execute the same instruction out-of-phase with each other or may execute different instructions altogether.

Because MIMD operations are performed asynchronously and SIMD operations are performed synchronously, a MIMD-to-SIMD resynchronizer 51 (FIG. 1) is provided for transitioning the processor array from MIMD to SIMD mode. The resynchronizer 51 comprises, e.g., a pull-up resistor with a connection to a flag-out on each processor element. On FIG. 1, this connection is partially hidden by the multiplexing means 3. An "and-tied" signal from each processor's flag-out to the resynchronizer 51 is driven "low" during MIMD operation. As each processor element decides that it should begin SIMD operation, each releases the and-tied signal and begins polling the signal for a "high" state. When all the processor elements have released the and-tied signal, the pull-up resistor causes the signal to go to a "high" state. All of the processor elements detect that change of state on the same clock cycle, and each processor element branches into its copy of the SIMD portion of its instruction stream. As is set forth above and discussed in further detail below, a duplicate copy of the SIMD instructions is provided in each processor's associated dual-ported memory, and it is this duplicate copy which is executed by each processor element.

Figure 5:
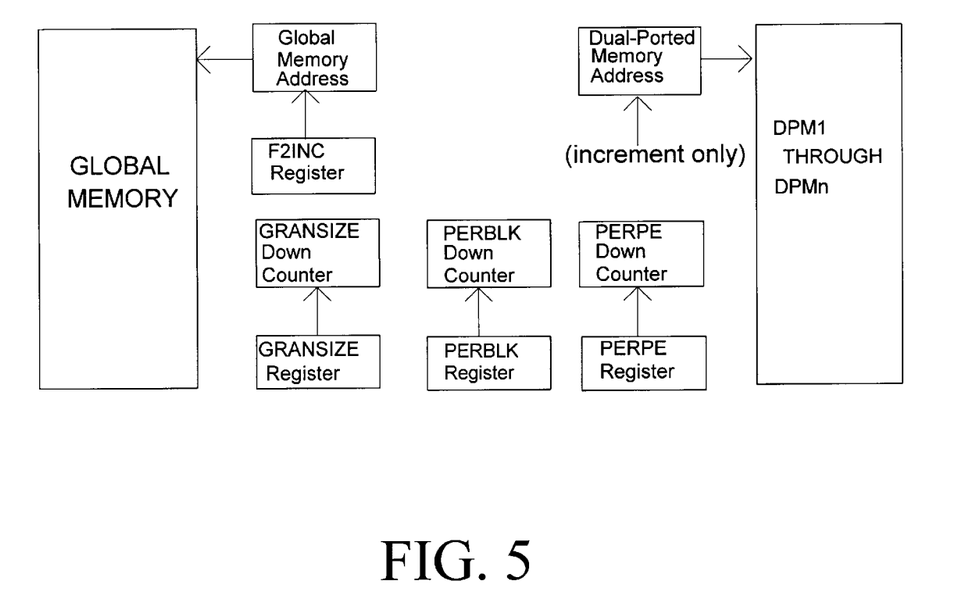
FIG. 5 shows a block diagram illustrating how the multidimensional DMA engine of the DMA controller distributes data to the processor elements.

FIG. 5 illustrates how the multidimensional DMA engine of the DMA controller 7 (FIG. 1) distributes data to the processor elements in the processor array. The multidimensional DMA engine fetches data from both linear and two-dimensional data structures in global memory and partitions it across processor elements via each element's associated dual-ported memory DPM1 through DPMn. The DMA engine is designed to allow array rows or columns to be passed to each processor element, thereby reducing the amount of data movement required via the link ports in SIMD operation and allowing matrix data partitioning among processor elements in MIMD operation. This is implemented via four register values, FT2INC, PERPE, PERBLK, and GRANSIZE. The address registers are initialized to the staring address of the transfer in global memory and dual-ported memory. Each transfer is performed in multiples of GRANSIZE words (32 bits). Two down counters, the PERPE counter and the PERBLK counter, are initialized with the PERPE and PERBLK registers. When each block of GRANSIZE words is transferred to/from a dual-ported memory the PERPE and the PERBLK counters are decremented. When the PEBPE counter reaches zero, the DMA controller advances to the dual-ported memory of the next processor element. When the PERBLK counter reaches zero, the DMA controller adds FT2INC to the global memory address counter; the dual-ported memory address counter always increments by one word. During broadcast operation, the PERPE counter is not used and all the processor elements receive the data. Participating processor elements are selected in bit registers. This functionality allows matrices to be partitioned on rows or columns, including both single floating point values or complex values. In addition, the DMA engine provides matrix transposes about both main and antidiagonal.

In addition to MIMD and SIMD modes, the microprocessor architecture of the invention also supports SISD and MISD modes. The broadcast function of the DMA controller 7 is used to provide the data set duplication required for MISD operation and the instruction duplication required for SISD operation.

Figure 6:
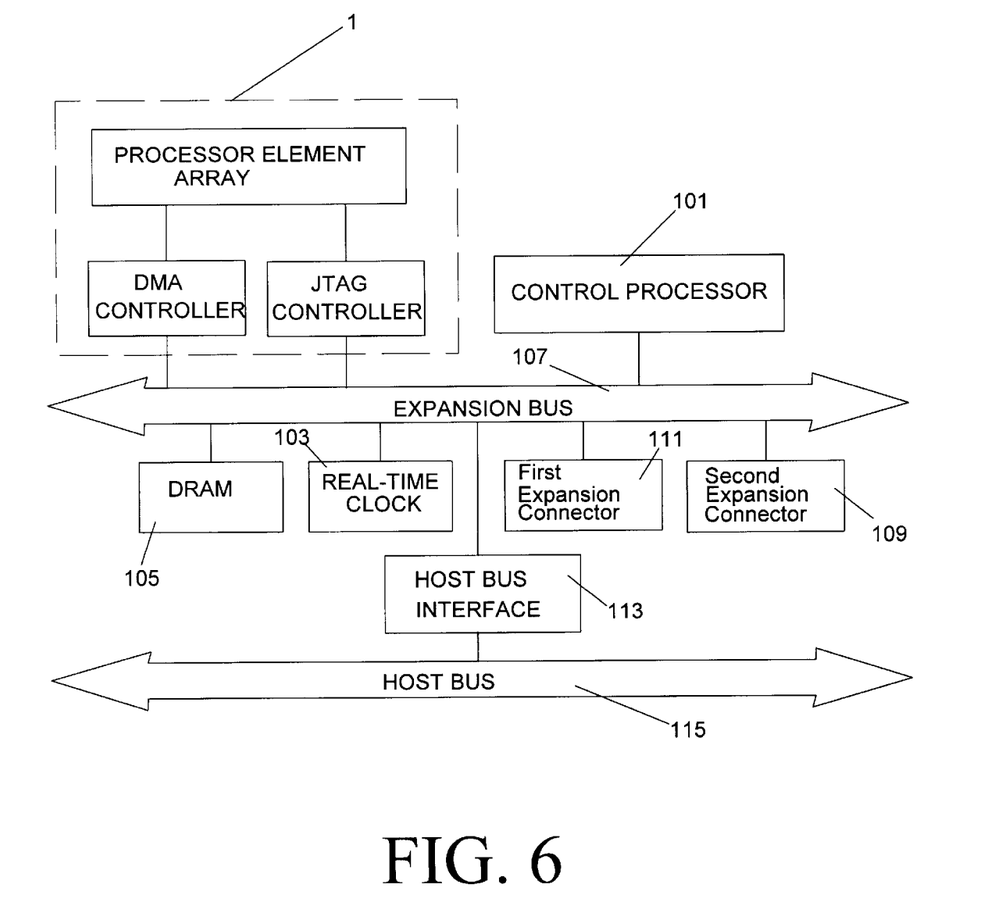
FIG. 6 shows a schematic block diagram illustrating application of the architecture of the invention to a computer main board.

FIG. 6 illustrates application of the architecture of the invention to a computer main board. A control processor 101 supplies operating system support to the processor elements and to a host's operating system. The control processor 101 further manages global DRAM memory, manages system I/O devices, and supplies operating system services to the processor elements. A 160 MB/s expansion bus 107 supports DMA transfers to the processor element array, and also supports DMA transfers generated by expansion interfaces and a host bus interface 113. Global DRAM memory 105 provides global memory resources to the DMA controller. A real-time clock 103 supplies a 1 Mhz time reference for programs. The host bus interface 113 provides a link to a host bus 115. The host bus 115 comprises, e.g., a VME, ISA, or PCI bus. First and second expansion bus connectors 111 and 109 provide connections for daughter cards. A JTAG controller 55 (FIG. 1) connects to a JTAG interface on each of the processor elements and provides a scan chain that is used to verify soldering of the processor elements during manufacture and to assist in the testing of the board after assembly. During normal operation, the JTAG controller's interface supplies a relatively low-performance interface to the processor elements. It thereby serves as a debugger interface for controlling on-chip break-point logic during debugging of programs and also serves as a profiler interface for collecting statistical information regarding the processor elements' execution of a program.

As will be recognized by those skilled in the art, the multi-processor device of the invention provides reduced contention over prior art devices in that processor elements do not contend for data on a common bus. The invention further provides such advantages as improved scalability and improved data flow with reduced bottle necks and bus contention. It will further be recognized that the present invention obtains significant advantage in that it provides the capability for simultaneous performance of such functions as: DMA to DRAM transfers, host access to DRAM, DMA DRAM transfers to or from VRAM (via multidimensional DMA engine), DMA VRAM transfers to or from internal processor RAM, DMA transfers between processor elements (via link ports), processor computations, and control processor or DMA/host communication.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A parallel-processing computer for performing MIMD and SIMD operations, comprising:

first processor means having a first inter-processor communication port means associated therewith and having a first memory interface associated therewith;

second processor means having a second inter-processor communication port means associated therewith and a second memory interface associated therewith;

means for operatively connecting said first inter-processor communication port means to said second inter-processor communication port means;

first memory means, said first memory means having a first port means operatively connected to said first memory interface means and having a second port means in communication with a global memory means;

second memory means, said second memory means having a third port means operatively connected to said second memory interface means and a fourth port means in communication with said global memory means; and, means for receiving instruction sets from said global memory means and for sending duplicate copies of said instruction sets to each of said first and second memory means.

2. The parallel-processing computer according to claim 1, wherein said first and second inter-processor communication port means comprise link ports.

3. The parallel-processing computer according to claim 1, wherein said first and second memory interface means comprise direct memory access interfaces.

4. The parallel-processing computer according to claim 1, wherein said means for operatively connecting said first inter-processor communication port means to said second inter-processor communication port means comprises a multiplexing means.

5. The parallel-processing computer according to claim 4, wherein said multiplexing means comprises at least one cross-bar switch.

6. The parallel-processing computer according to claim 4, wherein said multiplexing means comprises at least one CMOS switch.

7. The parallel-processing computer according to claim 1, wherein said first and second memory means comprise dual-ported memories.

8. The parallel-processing computer according to claim 1, wherein means for receiving instruction sets comprises a direct memory access controller.

9. The parallel-processing computer according to claim 1, wherein said first and second inter-processor communication port means comprise first and second pluralities of link ports and wherein said means for operatively connecting comprises a multiplexing means for dynamically reconfiguring connections between said first and second pluralities of link ports.

10. The parallel-processing computer according to claim 1, further comprising a MIMD-to-SIMD resynchronizing means for synchronizing operation of said first and second processor means when said processor means enter a SIMD mode of operation.

* * * * *